United States Patent Office 3,530,364
Patented Sept. 22, 1970

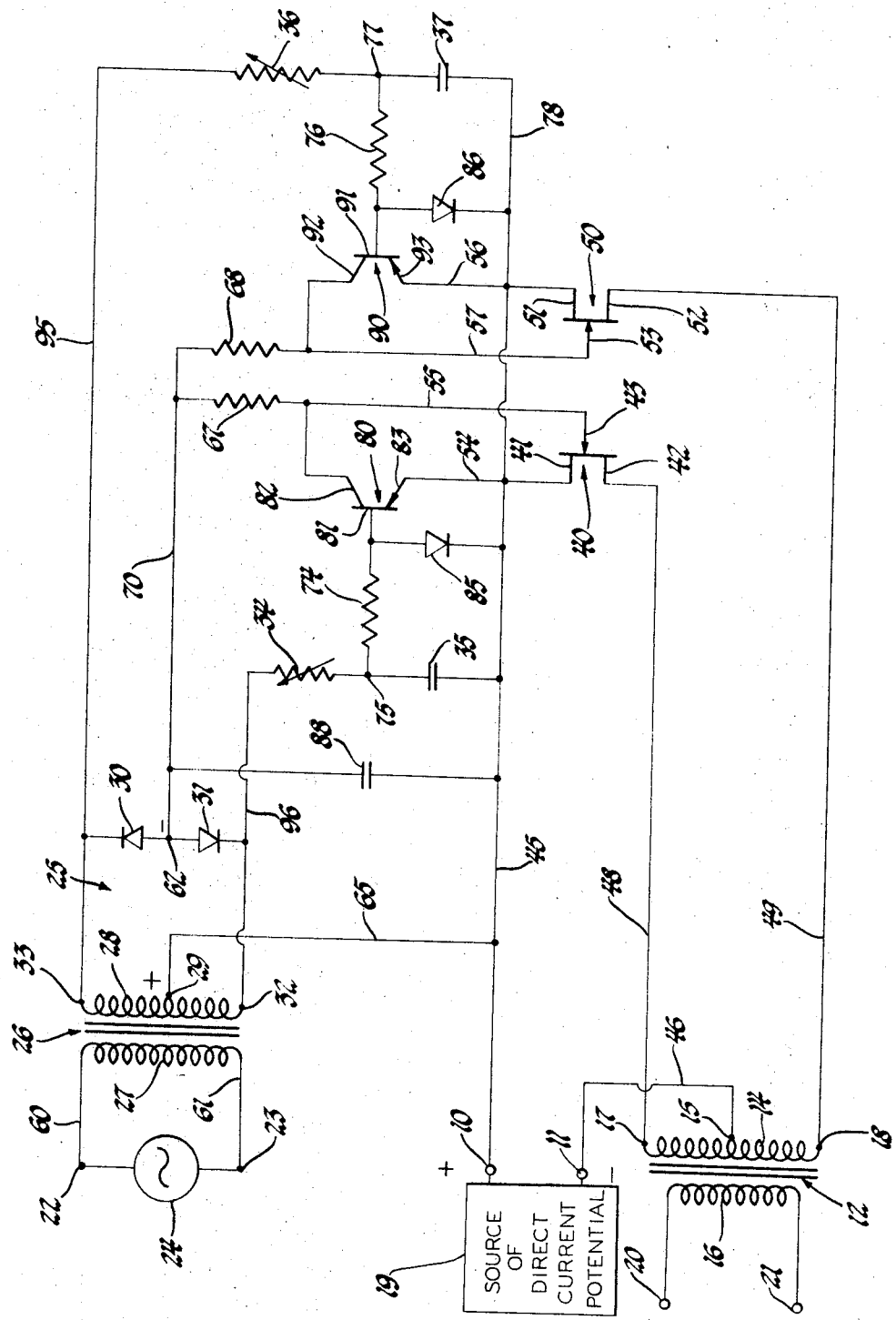

3,530,364
CIRCUIT FOR CONVERTING A DIRECT CURRENT POTENTIAL TO AN ALTERNATING CURRENT POTENTIAL
Robert E. Nelson and Carl B. Davis, Indianapolis, Ind., assignors to General Motors Corporation, Detroit, Mich., a corporation of Delaware
Filed May 27, 1969, Ser. No. 828,130
Int. Cl. H02m 7/48
U.S. Cl. 321—45                                     3 Claims

ABSTRACT OF THE DISCLOSURE

A circuit for converting a direct current potential, applied across a two terminal input circuit, to an alternating current potential. One direct current input terminal is connected to the center tap of a transformer center tapped primary winding and the other is connected to the terminal ends of the transformer primary winding through the current carrying electrodes of two normally non-conducting field effect transistors, in parallel. Respective transistors, the current carrying electrodes of each of which are connected across a selected one current carrying electrode and the gate electrode of a respective field effect transistor, are alternately rendered conductive to substantially remove the gate bias from the corresponding field effect transistor by an alternating current driving signal which is applied through a phase shifting network across the control electrode and one current carrying electrode of both transistors in an opposite phase relationship. The output signal is taken from the secondary winding of the transformer and is produced by the alternately conducting field effect transistors which establish the direct current input circuit for current flow in one direction between one terminal end of the transformer primary winding and the center tap and in the opposite direction between the other terminal end of the primary winding and the center tap.

This invention is directed to a circuit for converting a direct current potential to an alternating current potential and, more specifically, to a circuit of this type which includes a feature for shifting the phase of the output potential relative to the phase of the alternating current driving signal.

As many applications require the alternating current output potential of a DC to AC converter or "chopper" circuit to be shifted in phase relative to the alternating current driving signals, it is an object of this invention to provide an improved circuit possessing this feature.

It is another object of this invention to provide an improved circuit for converting a direct current potential to an alternating current potential using all solid state switching components.

In accordance with this invention, a circuit for converting a direct current potential applied across the input circuit to an alternating current output potential is provided wherein two field effect transistors, the current carrying electrodes of which are connected in parallel across the input circuit, are alternately rendered conductive by alternating current driving signals to produce an alternating current output potential in an output circuit which is interconnected with the input circuit in such a manner that with one field transistor conducting through the current carrying electrodes thereof, the output potential is of a selected one polarity and with the other one of the field effect transitors conducting through the current carrying electrodes thereof, the output potential is of the opposite polarity.

For a better understanding of the present invention, together with additional objects, advantages and features thereof, reference is made to the following description and accompanying single figure drawing wherein the novel circuit of this invention is set forth in schematic form.

Referring to the drawing, the novel circuit of this invention includes a direct current input circuit, across which a direct current potential source 19 to be converted may be applied, comprising input terminals 10 and 11, transformer 12 and first and second field effect transistors 40 and 50 each having a gate electrode, 43 and 53, respectively, and two current carrying electrodes, 41–42 and 51–52, respectively, connected in parallel across the direct current input circuit for establishing and interrupting the direct current input circuit; an output circuit, terminal 20 and 21 and secondary winding 16 of transformer 12, interconnected with the direct current input circuit in such a manner that with one of the field effect transistors conducting through the current carrying electrodes thereof the output potential is of one polarity and with the other one of the field effect transistors conducting through the current carrying electrodes thereof the output potential is of opposite polarity; an alternating current input circuit, terminals 22 and 23, across which a source of alternating current driving signals 24 may be applied; first and second transistors, 80 and 90, each having two current carrying electrodes and a control electrode with the current carrying electrodes of each connected in parallel with a selected one of the current carrying electrodes and the gate electrode of a respective one field effect transistor, a source of direct current operating potential, rectifier circuit 25, applied across one of the current carrying electrodes and the gate electrode of both field effect transistors and the current carrying electrodes of both transistors in parallel and circuitry including respective phase shift networks, resistors 34 and 74 and capacitor 35 and resistors 36 and 76 and capacitor 37, for applying the alternating current driving signals across a selected one of the current carrying electrodes and the control electrode of both transistors in an opposite phase relationship for rendering the transistors alternately conductive through the current carrying electrodes thereof whereby the operating potential is substantially removed from across the selected one of the current carrying electrodes and the gate electrode of the field effect transistor across which the current carrying electrodes of the conducting transistors are connected.

Although elements 10, 11, 20, 21, 22 and 23 have been hereinabove described as and will be hereinafter referred to as terminals, it is to be specifically understood that these elements may be any other of several electrical devices suitable for effecting a connection to external circuitry.

As direct current potential source 19 may be any source of direct current potential and, per se, forms no part of this invention, it has been indicated in the drawing in block form.

The current carrying electrodes, source electrode 41 and drain electrode 42 of field effect transistor 40 and source electrode 51 and drain electrode 52 of field effect transistor 50, are connected in parallel across the direct current input circuitry through respective terminal ends 17 and 18 and the center tap 15 of the primary winding 14 of transformer 12. Respective source electrodes 41 and 51 are connected in input circuit terminal 10 through lead 45, center tap 15 of primary winding 14 of transformer 12 is connected to the other input terminal 11 through lead 46 and respective drain electrodes 42 and 52 are ocnnected to respective terminal ends 17 and 18 of primary winding 14 of transformer 12 through leads 48 and 49, respectively. The current carrying electrodes of each of transistors 80 and 90, emitter electrode 83 and collector electrode 82 of transistor 80 and emitter electrode 93 and collector electrode 92 of transistor 90, are connected in parallel with a selected one of the current carrying electrodes and the gate electrode of a respective one of field effect transistors 40 and 50, source electrode 41 and gate electrode 43 and source electrode 51 and gate electrode 53, respectively, through leads 54–55 and 56–57, respectively.

To provide a source of direct current operating potential, the alternating current driving signals produced by driving signal source 24, connected across input terminals 22 and 23, may be full-wave rectified in a rectifier circuit 25 comprising a rectifier transformer 26 having a primary winding 27, a secondary winding 28 having a center tap 29 and two diodes 30 and 31 connected in series across the terminal ends 32 and 33 of secondary winding 28 of transformer 26 in an opposite polarity relationship. The signals produced by source of alternating current driving signals 24, applied across the primary winding 27 of rectifier transformer 26 which is connected to input terminals 22 and 23 through leads 60 and 61, respectively, are full-wave rectified by diodes 30 and 31 to produce a direct current operating potential which is of a positive polarity at center tap 29 of the secondary winding 28 of rectifier transformer 26 and of a negative polarity at junction 62 between diodes 30 and 31.

The source of direct current operating potential is applied across a selected one of the current carrying electrodes and the gate electrode of both field effect transistors 40 and 50 and the current carrying electrodes of both transistors 80 and 90 in parallel. Source electrodes 41 and 51 of respective field effect transistors 40 and 50 and emitter electrodes 83 and 93 of respective transistors 80 and 90 are connected to the center tap 29 of secondary winding 28 of rectifier transformer 26 through leads 45 and 65 and the gate electrodes 43 and 53 of respective field effect transistors 40 and 50 and collector electrodes 82 and 92 of respective transistors 80 and 90 are connected to junction 62 between diodes 30 and 31 through respective parallel resistors 67 and 68 and lead 70.

The alternating current driving signals are applied through circuitry including respective phase shift networks across a selected one current carrying electrode and the control electrode of both transistors 80 and 90 in an opposite phase relationship for rendering transistors 80 and 90 alternately conductive through the current carrying electrodes thereof whereby the operating potential is substantially removed from across a selected one curretn carrying electrode and the gate electrode of the field effect transistor across which the current carrying electrodes of the conducting transistor is connected. Base electrodes 81 and 91 of respective transistors 80 and 90 are connected to respective terminal ends 32 and 33 of secondary winding 28 of rectifier transformer 26 through respective series connected resistors 74 and 34 and 76 and 36. First and second capacitors 35 and 37 are included in the phase shift network, one of the capacitors being connected across the junction between each of the two series connected resistors and the emitter electrode of the corresponding transistor. That is, capacitor 35 is connected across junction 75 between series connected resistors 74 and 34 and the emitter electrode 83 of the corresponding transistor 80 through lead 45 and capacitor 37 is connected to junction 77 between series connected resistors 76 and 36 and to the emitter electrode 93 of corresponding transistor 90 through lead 78.

Diodes 85 and 86 are connected across the base-emitter electrodes of respective transistor 80 and 90 to provide reverse polarity potential protection for the base-emitter junction of the corresponding transistor while the terminal end of secondary winding 28 of rectifier transformer 26 to which the base electrode of the corresponding transistor is connected is of a positive polarity. Capacitor 88 is a filter capacitor which smoothes the direct current output of rectifier circuit 25 previously described.

In the drawing, field effect transistors 40 and 50 are indicated to be of the N channel type and transistors 80 and 90 are indicated to be of the PNP type. It is to be specifically understood, however, that devices of the alternate type may be substituted therefor, with compatible electrical polarities, without departing from the spirit of the invention.

Source electrodes 41 and 51 of respective field effect transistors 40 and 50 are connected to positive polarity center tap 29 of secondary winding 28 of rectifier transformer 26 through leads 45 and 65 and the gate electrodes 43 and 53 of respective field effect transistors 40 and 50 are connected to negative polarity junction 62 between diodes 30 and 31 of rectifier circuit 25 through respective parallel resistors 67 and 68 and lead 70. Consequently, the electrostatic field produced by the negative polarity potential upon the gate electrodes 43 and 53 of respective field effect transistors 40 and 50, with respect to respective source electrodes 41 and 51, maintains these devices normally not conducting.

Collector electrodes 82 and 92 of respective type PNP transistors 80 and 90 are connected to negative polarity junction 62 between diodes 30 and 31 of rectifier circuit 25 through respective parallel resistors 67 and 68 and lead 70 and the emitter electrodes 82 and 93 of respective transistors 80 and 90 are connected to positive polarity center tap 29 of secondary winding 28 of rectifier transformer 26 through leads 45 and 65. Consequently, the operating potential produced by rectifier circuit 25 is applied across the emitter-collector electrodes of type PNP transistors 80 and 90 in the proper polarity relationship for forward conduction through the emitter-collector electrodes thereof.

With the application of alternating current driving signals across primary winding 27 of rectifier transformer 26, the electrical polarity of terminal ends 32 and 33 of secondary winding 28 becomes alternately positive and negative with respect to center tap 29.

Over the half cycles of the alternating current driving signals during which terminal ends 32 and 33 of the secondary winding 28 of rectifier transformer 26 are of a positive and a negative polarity, respectively, with respect to center tap 29, a potential of the proper polarity relationship to produce emitter-base current flow through a type PNP transistor is applied across the base-emitter electrodes of type PNP transistor 90 through a circuit which may be traced from positive polarity center tap 29 of secondary winding 28 of rectifier transformer 26, through leads 65, 45 and 56, the emitter-base junction of type PNP transistor 90, series resistors 76 and 36 and lead 95 to terminal end 33 of secondary winding 28 of rectifier transformer 26 which is of a negative polarity with respect to center tap 29 during these half cycles.

The emitter-base current flow, produced by the driving signals during these half cycles, through type PNP transistor 90 results in emitter-collector current flow through this device through a circuit which may be traced from center tap 29 of secondary winding 28 of rectifier transformer 26, through leads 65, 45 and 56, the emitter-collector electrodes of type PNP transistor 90, resistor 68, lead 70 to negative polarity junction 62 between diodes 30 and 31 of rectifier circuit 25 and diode 30 to terminal end 33 of secondary winding 28 of rectifier transformer 26.

During these half cycles, the driving signals are applied in an opposite phase and in a reverse polarity relationship across the emitter-base electrodes of type PNP transistor 80. That is, the positive polarity potential, with respect to center tap 29, of terminal end 32 of secondary winding 28, of rectifier transformer 26 is applied to the base electrode 81 of type PNP transistor 80 through series resistors 34 and 74 and the more negative polarity potential of center tap 29 is applied to the emitter electrode 83 of type PNP transistor 80 through leads 65, 45 and 54. As this is not the current potential polarity relationship to produce emitter-base current flow through a type PNP transistor, transistor 80 remains non-conductive during these half cycles of the alternating current driving signals.

With the transistor 90 conducting through the emitter-collector electrodes thereof, the operating potential produced by rectifier circuit 25 is substantially removed from gate electrode 53 of field effect transistor 50, a condition which permits this device to conduct through the source-drain electrodes thereof to establish the direct current input circuit. That is, conducting field effect transistor 50 completes a circuit for the flow of direct current from source of direct current potential 19, through input terminal 11, lead 46, through that portion of secondary winding 14 of transformer 12 between center tap 15 and terminal end 18, lead 49, the source-drain electrodes of field effect transistor 50, lead 45 and input circuit terminal 10 to source of direct current potential 19. This flow of direct current through that portion of primary winding 14 of transformer 12 between center tap 15 and terminal end 18 produces an increasing magnetic field which induces a potential of a first polarity in secondary winding 16 of transformer 12, in a well-known manner.

At the conclusion of each half cycle of the alternating current driving signals during which terminal end 32 of secondary winding 28 of rectifier transformer 26 is of a positive polarity, the driving signal potential decreases to a value which is of an insufficient magnitude to maintain emitter-base current flow through transistor 90, consequently, this device goes non-conductive. As transistor 90 goes non-conductive, the operating potential is again applied across the gate-source electrodes of field effect transistor 50, a condition which renders this device non-conducting to interrupt the direct current input circuit.

Over the half cycles of the alternating current driving signals during which terminal ends 33 and 32 of the secondary winding 28 of rectifier transformer 26 are of a positive and a negative polarity, respectively, with respect to center tap 29, a potential of the proper polarity relationship to produce emitter-base current flow through a type PNP transistor is applied across the base-emitter electrodes of type PNP transistor 80 through a circuit which may be traced from positive polarity center tap 29 of secondary winding 28 of rectifier transformer 26, through leads 65, 45 and 54, the emitter-base junction of type PNP transistor 80, series resistors 74 and 34 and lead 96 to terminal end 32 of secondary winding 28 of rectifier transformer 26 which is of a negative polarity with respect to center tap 29 during these half cycles.

The emitter-base current flow, produced by the driving signals during these half cycles through type PNP transistor 80 results in emitter-collector current flow through this device through a circuit which may be traced from center tap 29 of secondary winding 28 of rectifier transformer 26, through leads 45, 54, the emitter-collector electrodes of type PNP transistor 80, resistor 67, lead 70 to negative polarity junction 62 between diodes 30 and 31 of rectifier circuit 25, through diode to terminal end 32 of secondary winding 28 rectifier transformer 26.

During these half cycles, the driving signals are applied in an opposite phase and a reverse polarity relationship across the emitter-base electrodes of type PNP transistor 90. That is, the positive polarity potential, with respect to center tap 29, of terminal end 33 of secondary winding 28, of rectifier transformer 26 is applied to the base electrode 91 of type PNP transistor 90 through series resistors 36 and 76 and the more negative polarity potential of center tap 29 is applied to the emitter electrode 93 of type PNP transistor 90 through leads 65, 45 and 56. As this is not the correct potential polarity relationship to produce emitter-base current flow through a type PNP transistor, transistor 90 remains non-conductive during these half cycles of the alternating current driving signals.

With the transistor 80 conducting through the emitter-collector electrodes thereof, the operating potential produced by rectifier circuit 25 is substantially removed from gate electrode 43 of field effect transistor 40, a condition which permits this device to conduct through the source-drain electrodes thereof to establish the direct current input circuit. That is, conducting field effect transistor 40 completes a circuit for the flow of direct current from source of direct current potential 19, through input terminal 11, lead 46, through that portion of secondary winding 14 of transformer 12 between center tap 15 and terminal end 17, lead 48, the source-drain electrodes of field effect transistor 40, lead 45 and input circuit terminal 10 to source of direct current potential 19. This flow of direct current through that portion of primary winding 14 of transformer 12 between center tap 15 and terminal end 17 produces an increasing magnetic field which induces a potential in secondary winding 16 of transformer 12 in a well-known manner, which is of a polarity opposite to the polarity of the potential induced in secondary winding 16 by the magnetic field produced by direct current flow through that portion of primary winding 14 between center tap 15 and terminal end 18, previously described.

At the conclusion of each half cycle of the alternating current driving signals during which terminal end 33 of secondary winding 28 of rectifier transformer 26 is of a positive polarity, the driving signal potential decreases to a value which is of an insufficient magnitude to maintain emitter-base current flow through transistor 80, consequently, this device goes nonconductive. As transistor 80 goes non-conductive, the operating potential is again applied across the gate-source electrodes of field effect transistor 40, a condition which renders this device non-conducting to interrupt the direct current input circuit.

From this description, it is apparent that transistors 80 and 90 and, consequently, field effect transistors 40 and 50 are rendered alternatively conducive by the driving signals appearing across input terminals 22 and 23 to produce an alternating current output signal across primary winding 16 of transformer 12.

Resistors 34 and 74 and capacitor 35, included in the circuit for applying the driving signals produced by driving signal source 24 across the emitter-base electrodes of transistor 80, and resistors 36 and 76 and capacitor 37, included in the circuit for applying the driving signals across the emitter-base electrodes of transistor 90, are phase shift networks which operate to delay the application of the driving signals across the respective emitter-base electrodes of these transistors. That is, the driving signals will appear across the emitter-base electrodes of transistors 80 and 90 at some electrical angle later than these signals appear across terminal ends 32 and 33 and center tap 29 of secondary winding 28 of rectifier transformer 26 by an amount determined by the values of resistors 34 and 74 and caapcitor 35 and resistors 36 and 76 and capacitor 37.

During those half cycles of the alternating current driving signals during which terminal end 32 is of a positive polarity and terminal end 33 is of a negative polarity, capacitor 37 will begin to charge through a circuit which may be traced from center tap 29, through leads 65, 45 and 78, capacitor 37, resistor 36 and lead 95 to terminal end 33 of secondary winding 28. Consequently, the potential appearing across junction 77 and emitter electrode 93 of transistor 90 will increase in magnitude with the charge on capacitor 37. Consequently, the driving signals will not produce emitter-base current flow through type PNP transistor 90 until capacitor 37 has become charged to a potential which is greater than the emitter-base junction breakdown potential of the type PNP transistor selected as transistor 90. The time required for capacitor 37 to reach this charge may be altered by changing the resistance value of resistor 36, which may be a variable resistor, as shown in the drawing, or a fixed resistor, if so desired.

During those half cycles of the alternating current driving signals during which terminal end 33 is of a positive polarity and terminal end 32 is of a negative polarity, capacitor 35 will begin to charge through a circuit which may be traced from center tap 29, through leads 65 and 45, capacitor 35, resistor 34 and lead 96 to terminal end 32 of secondary winding 28. Consequently, the potential appearing across junction 75 and emitter electrode 83 of transistor 80 will increase in magnitude with the charge on capacitor 35. Consequently, the driving signals will not produce emitter-base current flow through type PNP transistor 80 until capacitor 35 has become charged to a potential which is greater than the emitter-base junction breakdown potential of the type PNP transistor selected as transistor 80. The time required for capacitor 35 to reach this charge may be altered by changing the resistance value of resistor 34 which may be a variable resistor, as shown in the drawing, or a fixed resistor, if so desired.

Therefore, the output signals appearing across secondary winding 16 of transformer 12 are out of phase with the alternating current driving signals by an amount equal to the time constant of resistor 34 and capacitor 35 and resistor 36 and capacitor 37. This degree of lag may be adjusted by adjusting the value of resistors 34 and 36.

In a practical application, the source of driving signals 24 produced a 400 cycle, 6.3 volt alternating current signal and the windings of rectifier transformer 26 were so proportioned to produce a potential upon junction 62 of negative 10 volts direct current. Other circuit elements are as follows:

Field effect transistors 40 and 50—Type 2N4392
Transistors 80 and 90—Type 2N2907A
Capacitors 35 and 37—.047 microfarads
Resistors 34 and 36—22K max.
Resistors 67 and 68—15K
Resistors 74 and 76—27K
Diodes 30, 31, 85 and 86—1N645

The circuit set forth in the figure was designed for use with an ungrounded thermocouple input corresponding to source 19. A particular advantage of this circuit is that it is ideally suited for use with sources of this type as the circuit is electrically isolated from the source.

What is claimed is:

1. A circuit for converting a direct current potential to an alternating current output potential comprising, a direct current input circuit across which a direct current potential source to be converted may be applied, first and second field effect transistors each having a gate electrode and two current carrying electrodes, means for connecting said current carrying electrodes of said field effect transistors in parallel across said direct current input circuit for establishing and interrupting said direct current input circuit, and output circuit across which an output potential appears interconnected with said direct current input circuit in such a manner that with one of said field effect transistors conducting through said current carrying electrodes thereof said output potential is of one polarity and with the other one of said field effect transistors conducting through said current carrying electrodes thereof said output potential is of the opposite polarity, an alternating current input circuit across which a source of alternating current driving signals may be applied, first and second transistors each having two current carrying electrodes and a control electrode, means for connecting said current carrying electrodes of each of said transistors in parallel with a selected one of said current carrying electrodes and said gate electrode of a respective one of said field effect transistors, a source of direct current operating potential, means for applying said direct current operating potential across said selected one of said current carrying electrodes and said gate electrode of both said field effect transistors and said current carrying electrodes of both said transistors in parallel, and circuit means including respective phase shift networks for applying said alternating current driving signals across a selected one of said current carrying electrodes and said control electrode of both said transistors in an opposite phase relationship for rendering said transistors alternately conductive through said current carrying electrodes thereof whereby said operating potential is substantially removed from across said selected one of said current carrying electrodes and said gate electrode of the said field effect transistor across which said current carrying electrodes of the conducting said transistor are connected.

2. A circuit for converting a direct current potential to an alternating current output potential comprising, a direct current input circuit means across which a direct current potential source to be converted may be applied, a transformer having a center tapped primary winding and a secondary winding, an output circuit including said transformer secondary winding, first and second field effect transistors each having two current carrying electrodes and a gate electrode, means for connecting said current electrodes of said field effect transistors in parallel across said direct current input circuit means through respective terminal ends and said center tap of said transformer primary winding for establishing and interrupting said input circuit, an alternating current input circuit across which a source of alternating current driving signals may be applied, first and second transistors each having two current carrying electrodes and a control electrode, means for connecting said current carrying electrodes of each of said transistors in parallel with a selected one of said current carrying electrodes and said gate electrode of a respective one of said field effect transistors, a source of direct current operating potential across said selected one of current carrying electrodes and said gate electrode of both of said field effect transistors and said current carrying electrodes of both said transistors in parallel and circuit means including respective phase shift networks for applying said alternating current driving signals across a selected one of said current carrying electrodes and said control electrode of both said transistors in an opposite phase relationship for rendering said transistors alternately conductive through said current carrying electrodes thereof whereby said operating potential is substantially removed from across said selected one of said current carrying electrodes and said gate electrode of the said field effect transistor across which said current carrying electrodes of the conducting said transistor are connected.

3. A circuit for converting a direct current potential to an alternating current output potential comprising, a transformer having a center tapped primary winding and a secondary winding, direct current input circuit terminals across which a direct current potential source to be converted may be applied, an output circuit terminal connected to each terminal end of said transformer secondary winding, first and second field effect transistors each having a source, a drain and a gate electrode, means for connecting said source electrodes of said field effect transistors to one of said direct current input circuit terminals, means for connecting said center tap of said transformer primary winding to the other one of said direct current input circuit terminals, means for connecting said drain electrode of each of said field effect transistors to a respective terminal end of said transformer primary winding, alternating current input circuit terminals across which a source of alternating current driving signals may be applied, a rectifier transformer having a primary winding and a center tapped secondary winding, means for connecting, said primary winding of said rectifier transformer across said alternating current input circuit terminals, first and second diodes, means for connecting said diodes in series across the terminal ends of said rectifier transformer secondary winding in an opposite polarity relationship, first and second transistors each having a base, an emitter and a collector electrode, means for connecting said source electrodes of said field effect transistors and said emitter electrodes of said transistors to said center tap of said rectifier transformer secondary winding, means for connecting said gate electrodes of said field effect transistors and said collector electrodes of said transistors to the junction between said diodes, circuit means including two series connected resistors for connecting said base electrode of each of said transistors to a respective terminal end of said rectifier transformer secondary winding, first and second capacitors and means for connecting one of said capacitors between the junction between each said two series connected resistors and said emitter electrode of the corresponding said transistor.

References Cited

UNITED STATES PATENTS

| | | | |
|---|---|---|---|
| 3,246,176 | 4/1966 | Nazareth | 30—304 XR |
| 3,421,072 | 1/1969 | Woolam | 307—251 XR |
| 3,458,798 | 7/1969 | Fang et al. | 321—43 |

OTHER REFERENCES

IBM Technical Disclosure Bulletin, "High-Speed IGFET Flip-Flop," vol. 9, No. 2, p. 210, July 1966.

WILLIAM M. SHOOP, JR., Primary Examiner

U.S. Cl. X.R.

307—251, 304